United States Patent
Bellotti

(10) Patent No.: US 8,489,599 B2
(45) Date of Patent: Jul. 16, 2013

(54) CONTEXT AND ACTIVITY-DRIVEN CONTENT DELIVERY AND INTERACTION

(75) Inventor: Victoria M. E. Bellotti, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 421 days.

(21) Appl. No.: 12/326,457

(22) Filed: Dec. 2, 2008

(65) Prior Publication Data

US 2010/0138416 A1   Jun. 3, 2010

(51) Int. Cl.
G06F 17/30 (2006.01)
(52) U.S. Cl.
USPC .......................................................... 707/736
(58) Field of Classification Search
None
See application file for complete search history.

(56) References Cited

U.S. PATENT DOCUMENTS

| | | | |
|---|---|---|---|
| 5,611,050 A | | 3/1997 | Theimer |
| 7,630,986 B1 * | | 12/2009 | Herz et al. .............................. 1/1 |
| 7,631,007 B2 * | | 12/2009 | Morris ......................... 705/7.11 |
| 7,797,306 B1 * | | 9/2010 | Pather et al. ................... 707/714 |
| 2002/0054174 A1 | | 5/2002 | Abbott |
| 2003/0063072 A1 * | | 4/2003 | Brandenberg et al. ........ 345/173 |
| 2007/0038603 A1 * | | 2/2007 | Guha ................................. 707/3 |
| 2007/0055657 A1 * | | 3/2007 | Yano ................................. 707/3 |
| 2007/0250901 A1 * | | 10/2007 | McIntire et al. ............... 725/146 |
| 2007/0288247 A1 * | | 12/2007 | Mackay ............................. 705/1 |
| 2008/0168135 A1 * | | 7/2008 | Redlich et al. ................. 709/204 |
| 2008/0172261 A1 * | | 7/2008 | Albertson et al. ................. 705/7 |
| 2009/0254971 A1 * | | 10/2009 | Herz et al. ......................... 726/1 |
| 2009/0265764 A1 * | | 10/2009 | Schultz et al. ..................... 726/4 |

FOREIGN PATENT DOCUMENTS

| | | |
|---|---|---|
| WO | 2006111935 A1 | 10/2006 |
| WO | 2007059241 A2 | 5/2007 |

OTHER PUBLICATIONS

Min Hong Yun et al., "Event-based multimedia object scheduling algorithm", Advanced Communication Technology, 2004, The 6th International Conference on Phoenix Park, Korea, Feb. 9-11, 2004, vol. 2, pp. 735-740, ISBN: 89-5519-119-7.
Al-Bin-Ali F: "Design Principles for Inducing Reactivity in Ubiquitous Environments", Pervasive Services, 2004, IEEE/ACS International Conference on Beirut, Lebanon Jul. 19-23, 2004, pp. 131-139, ISBN: 0-7695-2535-0.

* cited by examiner

*Primary Examiner* — Bai D. Vu
(74) *Attorney, Agent, or Firm* — Shun Yao; Park, Vaughan, Fleming & Dowler LLP

(57) ABSTRACT

One embodiment of the present invention provides a computing device that delivers personally-defined context-based content to a user. This computing device receives a set of contextual information with respect to the user, and processes the contextual information to determine a context which is associated with an activity being performed by the user. The computing device then determines whether either or both the context and a current activity of the user satisfy a trigger condition which has been previously defined by the user. If so, the computing device selects content from a content database, based on the context, to present to the user, and presents the selected content.

25 Claims, 4 Drawing Sheets

CONTEXT AND ACTIVITY-DRIVEN CONTENT DELIVERY AND INTERACTION

BACKGROUND

1. Field of the Invention

The present invention generally relates to techniques and systems for creating and presenting content to a user. More specifically, the present invention relates to techniques and systems for creating and presenting content based on contextual information.

2. Related Art

Advancements in computing technology continue to improve communication between people and provide versatile ways to deliver information. These advancements have allowed communities around the world to interact and share information with each other. In particular, mobile devices are becoming an integral part of human life, as people often carry a mobile device throughout their day. These mobile devices can include a mobile phone, a personal digital assistant (PDA), an MP3 player, a handheld game console, and a laptop computer. Newer generations of these mobile devices are developed with more computation power and a growing number of communication features.

In effect, many of these mobile devices can perpetuate a fast-paced lifestyle for their users, as they may help users schedule the time around their responsibilities. However, these technological advances do not effectively help their users cope with this increase in pace. Typical working professionals may have a number of communication channels that they monitor, and they often need to remind themselves to monitor these channels. Also, these users typically have a list of errands they need to complete, and this list may grow throughout a work week because they do not remember to complete these errands until the weekend. Furthermore, these users often need to continue advancing their skills, but their work and social schedules do not allow much free time for extended study.

Unfortunately, mobile devices are not effective in helping working professionals accommodate their responsibilities around their busy schedule, because these mobile devices are not capable of learning and understanding the behavior of their users. Furthermore, these mobile devices cannot determine when and how best to provide their users with information or suitable entertainment content, because they do not take into account the activities that their users are involved in.

SUMMARY

One embodiment of the present invention provides a computing device that delivers personally-defined context-based content to a user. This computing device receives a set of contextual information with respect to the user, and processes the contextual information to determine whether some aspect of the current context can be associated with a probable activity being performed by the user. The computing device then determines whether either or both the context and current activity of the user satisfy a trigger condition which has been previously defined by the user. If so, the computing device selects content from a content database, based on the context or activity, to present to the user, and presents the selected content.

In a variation on this embodiment, the computing device allows the user to create content that is associated with a user-defined contextual or activity-driven trigger condition. To do so, the computing device records the content that is provided by the user, and creates a content entry in the content database for the recorded content, wherein the content entry can be associated with a number of trigger conditions. Then, the computing device associates a trigger condition for the content entry with a user-defined context or activity. The computing device continuously compares previously-defined trigger conditions for the content entry with the ongoing context of the user and/or user activity. When a trigger condition is met, the computing device retrieves the associated content and presents it to the user.

In a further variation, the computing device allows the user to create shareable content. To do so, the computing device records the content that is provided by the user, and creates a content package for the recorded content. This content package can include the recorded content, and can include a number of user-defined trigger conditions. The user is capable of sharing the content package with other users by distributing the content package to other users, and/or by uploading the content package onto a public server. Furthermore, other users that download or receive the content package are allowed to insert, modify, and/or remove content or trigger conditions from the content package.

In a variation on this embodiment, the computing device defines a context by creating a context or activity entry in a context manager, and associates the context or activity entry with a set of contextual information.

In a further variation, the computing device evolves the presentation of content over time by updating the content entries in the content database and updating the context or activity entries in the context manager responsive to actions performed by the user.

In a variation on this embodiment, the computing device presents the selected content by following a number of pre-defined or user-defined presentation rules associated with the selected content, monitoring actions performed by the user, and presenting the selected content based on the actions performed by the user.

In a variation on this embodiment, the computing device presents the selected content by sharing the selected content with a remote device.

In a variation on this embodiment, the contextual information includes one or more of: time, date, location, proximity to a system-detectable tag (e.g., radio frequency identification (RFID) tag), device orientation, velocity, direction, distance, vibration, altitude, temperature, pressure, humidity, sound, luminous intensity, camera image, and video stream.

In a variation on this embodiment, the content includes at least one or more of: audio clip, image, video stream, language lesson, e-mail, weather report, calendar reminder, news feed, rich site summary (RSS) feed, and Internet blog.

Figure 1:
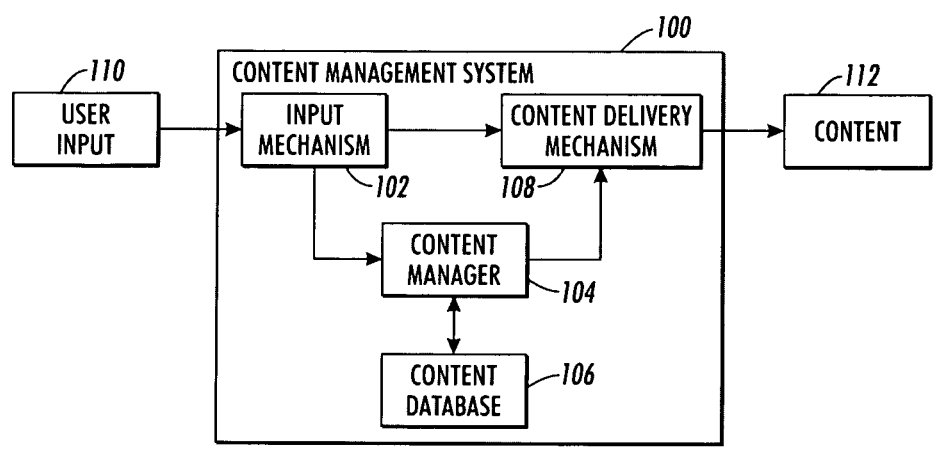
FIG. 1 illustrates a content management system in accordance with an embodiment of the present invention.

TABLE 1 illustrates an exemplary set of rules for presenting a content package to a user in accordance with an embodiment of the present invention.

TABLE 2 illustrates an exemplary set of rules for presenting a reminder content package to a user in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

Embodiments of the present invention provide a content management system for organizing and delivering packages of audio and visual content to a user in response to activities being performed by the user, and in response to a number of environmental factors associated with the user. The user activities and environmental factors that trigger a response from the content management system are defined by the user prior to enabling a given package of content. This content management system is intended to help a user manage their content and responsibilities around their schedule. Prior to operation, a user can upload or input content into the content management system, which may be music, study material, a to-do list, an RSS feed or any other content suitable for delivery in a range of contexts. The user can then specify the conditions under which the content can be presented, in terms of a sensed contextual information (e.g., temperature) or a user-defined context (e.g., a user activity). These conditions represent the triggers for presenting content, and are labeled using user-meaningful terms, such as time of day, day of week, a location identifier (e.g., "home") or a transportation modality (e.g., "on the train"), et cetera. The user can also specify a target audience for the content presentation, such as the user and/or other users.

In some embodiments, the user may define contexts or activities in terms of low-level contextual information that is associated with the user. Note that "context" and "activities" are not necessarily mutually exclusive. In one embodiment, a context can be based on or include one or more user activities. For example, if the content management system can sense motion, location, and time of day, then the user can define a context for walking from one location to another at a particular time of day, and label the context using human-meaningful terms (e.g., "walking to work," or "walking around the mall"). In another example, the user can define a context for moving around the yard, and label the context using a human-meaningful term "gardening." In some embodiments, the user may define an activity in terms of a high-level category of conditions, such as "concentrating," "receptive," or "active." For example, the user may define a context labeled "receptive" based on a number of user defined contexts associated with mindless tasks (e.g., "walking to work," "walking around the mall"). On the other hand, the user may define a context labeled "active" based on a number of user-defined contexts associated with physical activities (e.g., "jogging," "gardening"). The user can then define a trigger condition for certain content based on a high-level condition category which includes several low-level contexts.

During operation, the content management system can gather low-level contextual information from a number of input sources (e.g., a global positioning system (GPS) device, or an accelerometer), which reflects basic information associated with the user. Then, the content management system processes this contextual information to determine an inferred context, which has been defined in human-meaningful terms that describe an event or environmental factor associated with the user (e.g., "on the train after 5 P.M."). In some embodiments, the content management system can use this context to identify content that is ready to be presented in response to a user-defined context. In other embodiments, the content management system can use a user-defined context to search for and/or create content that can be presented to a user in a desired context.

The capabilities of the content management system can be applied to a number of applications. In some embodiments, the content management system can present instructional content under a given user-defined context. For example, the content management system can present visual lectures or interactive lessons to a user when the user is commuting to work in a bus or in a train. Similarly, the content management system can present audio-based instructional content to a user when the user is driving to work or is jogging. In other embodiments, the content management system can present entertainment content to the user when the user enters his or her living room after a long day of work.

In some embodiments, a user can create shareable content using the content management system on a mobile device or a personal computer (PC). The shareable content is a content package that a user can download, modify, and share with other content management systems. In some embodiments, a user can upload a content package onto an Internet website to share content the user created or modified using the content management system. In some other embodiments, a user can download a content package from an Internet website, and modify the content package to insert, modify, and/or remove content from the content package.

In some embodiments, the content management system can share content with a remote computing device. For example, a user can create an instructional or an entertainment content package on a content management system, specify a user-defined context for when the content can be presented, and share the content package with other content management systems. In other embodiments, the content management system can communicate content to a remote device under a given user-defined context. For example, the content management system can send a text message or an audio stream to the mobile telephone of a user's spouse to alert the spouse that the user is working late.

Content Management System

FIG. 1 illustrates a content management system 100 in accordance with an embodiment of the present invention. In some embodiments, content management system 100 can present content 112 to a user in response to actions being performed by the user, or other information that is associated with the user. In other embodiments, content management system 100 allows a user to create and store content, and associate the content with a given user-defined context. In one example, content management system 100 can present a given class of information to the user when the user is jogging, based on a high-level context labeled "active" which includes the low-level context labeled "jogging." In a second example, content management system 100 can remind the user to buy groceries as the user is driving past a grocery store after work. Furthermore, content management system 100 can read specific items on the grocery list to the user as the user walks across a corresponding aisle of the grocery store.

In some embodiments, content management system 100 includes an input mechanism 102, a context manager 104, a content database 106, and a content delivery mechanism 108. Input mechanism 102 receives a user input 110, which can include information provided by the user through an input device (e.g., a keyboard or a touch screen), or can include contextual information gathered from a number of input sources (e.g., a microphone, a camera, a motion sensor, a global positioning mechanism, or an Internet server).

Context manager 104 can control how content 112 is stored in content database 106, and can control how content 112 is selected from content database 106 for playback. In some embodiments, context manager 104 creates content 112 by providing content database 106 with a content package to be stored, which includes content 112 and a corresponding user-defined context that describes when content 112 can be presented. In response, content database 106 stores content 112, and associates content 112 with the specified user-defined context. In other embodiments, context manager 104 retrieves content 112 from content database 106 by providing content database 106 with a user-defined context that describes actions being performed by the user, and then receiving a corresponding content from content database 106.

Content delivery mechanism 108 can control how content 112 is presented to the user. In some embodiments, content delivery mechanism 108 presents content 112 to a user when context manager 104 selects content 112 for playback. In some variations on these embodiments, content delivery mechanism 108 can present content 112 in response to actions performed by the user, or interactions received from the user. For example, content delivery mechanism 108 may provide a user with a sequence of tasks to perform, such that content delivery mechanism 108 monitors the actions performed by the user, and advances to present a subsequent task once the user completes a given task. Context manager 104 can be configured to determine when the user completes a task by monitoring the information gathered by input mechanism 102, such as a microphone that gathers a verbal utterance of the user confirming the completion of a given task. In a second example, content delivery mechanism 108 may react to verbal requests or responses from the user as content delivery mechanism 108 presents content 112.

Contextual Information

Mobile devices often include a number of information-based capabilities that facilitate integrating these devices into the daily routine of their user. These capabilities can be configured to determine contextual information associated with a user, and the mobile devices can be configured to utilize this contextual information to determine when and how to present information to the user. In one embodiment, "contextual information" can be defined as input data that is gathered by a computing device from a number of input sources, and reflects basic information associated with the user and/or the operating environment of the computing device. In some embodiments of the present invention, contextual information is data that is recorded from a number of input sources without being interpreted by the computing device.

In some embodiments of the present invention, content management system 100 can determine contextual information associated with a user, including:

Time of day—Content management system 100 can keep track of time and date information. In some embodiments, content management system 100 can synchronize its time and date information with a time server (e.g., using the network time protocol (NTP)). In some embodiments, content management system 100 can take advantage of time of day, day of week, date, holidays, etc., as a contextual factor when delivering information.

Geographical location—Location awareness is becoming a prominent feature of mobile devices. In some embodiments, content management system 100 can determine its geographical location by GPS, cellular tower triangulation, Wi-Fi triangulation, or other means now known or later developed.

Motion detection—Some mobile devices are capable of detecting motion (i.e., whether they are moving, shaking, tilting, etc.). Content management system 100 can achieve motion detection by using an accelerometer, a gyroscope, or other means now known or later developed.

Sound detection—Mobile devices often include a microphone for capturing sounds, or can utilize a microphone as a peripheral device. In some embodiments, content management system 100 can use a microphone to capture verbal utterances of the user. In other embodiments, content management system 100 can use a microphone to capture ambient sounds.

Image detection—Mobile devices often include a camera for recording pictures and/or video, or can utilize a peripheral camera. In some embodiments, content management system 100 can use a camera to determine lighting levels.

Internet information—Mobile devices often have access to the Internet, either via a Wi-Fi connection and/or a cellular network. In some embodiments, content management system 100 utilizes an Internet connection to gather public context and content information. This context information can include a weather report, stock report, news event, and any other trigger event that is accessible from the Internet. The content information can include an audio clip, image, video stream, language lesson, e-mail, weather report, calendar reminder, news feed, rich site summary (RSS) feed, Internet blog, and any other content that is accessible from the Internet.

In some embodiments of the present invention, content management system 100 is designed to detect basic contextual information on the behavior of the user, including but not limited to: location, movement, sound, verbal utterances (e.g., speech), ambient voices (e.g., from a television or radio), keyboard clacking, lighting, brain activity readings, velocity, walking, driving, user input, routines or patterns in the behavior of the user, and vocal inflections or biometric readings indicating agitation and/or irritation.

In some embodiments, content management system 100 can be kept in continuous operation, and can sustain its awareness of contextual information associated with a user during operation. In some variations on these embodiments, content management system 100 monitors a number of sensors and/or input devices using input mechanism 102 to gather contextual information with respect to the user. In other variations, a sensor or input device can initiate a specific software process of content management system 100 for gathering new contextual information from the sensor or input device. In further embodiments, content management system 100 can awaken from a sleep mode of operation at predetermined time intervals to poll its current context and determine whether the context satisfies trigger conditions which are associated with content in database 106. If no relevant contextual triggers are satisfied by the context, then content management system 100 can return to the sleep mode of operation.

Context

In some embodiments, content management system 100 can determine a context associated with a user and/or operating conditions of the mobile device based on contextual information. Whenever input mechanism 102 gathers basic contextual information from a number of sources, context manager 104 can interpret the basic contextual information to infer a number of user-defined contexts. A context is a set of data that describes an event or environmental factor associated with a user or the operational environment of content management system 100. In some variations on these embodiments, a context can be inferred from contextual information gathered by input mechanism 102. In other variations, a context can be inferred from a number of contexts which have been inferred from contextual information. A context can also be inferred from a combination of contexts and contextual information.

For example, content management system 100 can be programmed to infer specific contexts about the user based on contextual information, including but not limited to whether the user is sitting down, watching TV, asleep, alert, talking, typing at the computer in the home study or at the office, walking around the house, walking outside the house, driving, or performing a household activity (e.g., cooking, or getting ready for work). In other examples, content management system 100 can be programmed to infer user patterns and preferences (e.g., taking the bus rather than walking when the weather is bad), possible hazards (e.g., darkness, weather warnings, proximity to crime zones), and the mental state of the user (e.g., mood, or concentration level).

Content

Mobile devices often include presentation mechanisms for reproducing audio and/or video content. In some embodiments of the present invention, content management system 100 uses these presentation mechanisms to present content that is triggered by a given context. In some variations on these embodiments, content management system 100 presents interactive content to the user, where a user can interact with the interactive content using input mechanism 102 of content management system 100 (e.g., pressing buttons, touching a location of a touch screen, or communicating verbal utterances into a microphone).

When content management system 100 infers a user-defined context that is associated with the user, content management system 100 can use the inferred context to search for content in content database 106, and retrieve content that can be presented under the given context. In some embodiments, content database 106 stores a set of content packages, where a content package includes a collection of content, and includes a number of contexts that can trigger content management system 100 to present content in the content package. In some variations on these embodiments, a content package can also include a script or executable code that can control how content is presented, and can implement the software mechanisms that interact with the user during presentation of the content.

In some embodiments of the present invention, content delivery mechanism 108 of content management system 100 can present content to a user in response to a context associated with the user. In other embodiments, content management system 100 can transmit content to a remote device in response to a context associated with the user.

In some embodiments of the present invention, content management system 100 can present content that is provided by a central publisher (e.g., a predetermined server). In other embodiments, content management system 100 can present content that is generated by the user. In a variation on these embodiments, content management system 100 can present content that is generated on a remote device, and is shared by the user of the remote device. For example, content management system 100 of a user that is driving toward a grocery store can automatically receive a grocery list that his wife generated for herself earlier that day using her content management system. Once the user enters the grocery store, his content management system 100 can present a combined grocery list that includes his grocery list items and her grocery list items.

In some variations on these embodiments, content management system 100 can be programmed to present content in response to a user-defined context for a number of applications, including: learning during spare time (e.g., a foreign language by listening, repeating, testing, etc.), automatic retrieval of important e-mail (e.g., subject to the user's attention span, and/or the urgency level of the content), receiving reminders (e.g., errands, purchases) at the right time and while in the right place, receiving directions to a desired location, playing music appropriate to the context of the user, and preparing to give a speech or a presentation by producing a section-by-section presentation layout. For example, a teacher can prepare a content package (e.g., a set of "audio study cards") designed to be present study material to a student during mornings, evenings, and weekends when the student is using a public mode of transportation. Furthermore, the teacher can configure the content package to define a timing and pace for the presentation of the content package, define the required responses from the student to given prompts or questions from the content package, and/or define a delay period for when a given prompt or question can be presented after a correct response from the user.

Delivering Content

Figure 2A:
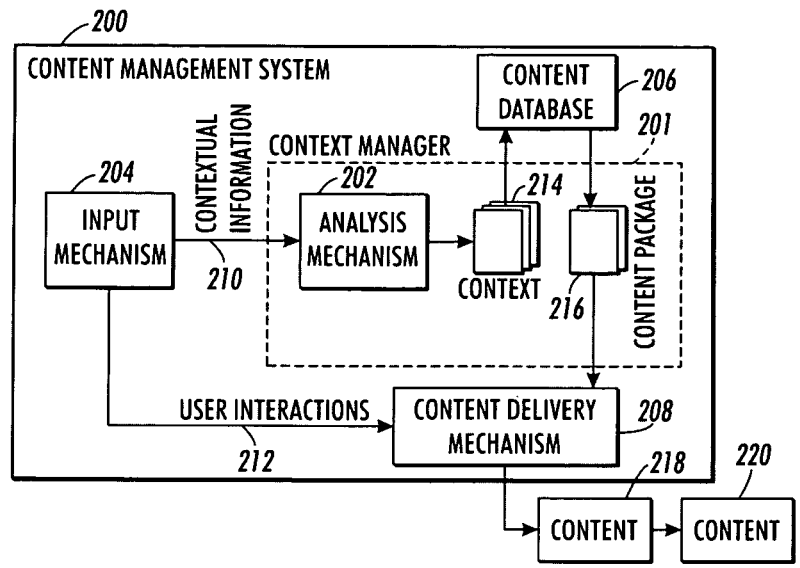
FIG. 2A illustrates a data flow for a content management system associated with delivering content to a user in accordance with an embodiment of the present invention.

FIG. 2A illustrates a data flow for a content management system 200 associated with delivering content to a user in accordance with an embodiment of the present invention. Content management system 200 includes a context manager 201, an input mechanism 204, a content database 206, and a content delivery mechanism 208. Input mechanism 204 gathers contextual information 210, which includes sensed information about the environment and about user activities, and sends contextual information 210 to an analysis mechanism 202 of context manager 201. Analysis mechanism 202 deduces a context 214 (which may include a user activity) from contextual information 210, and context manager 201 uses context 214 to retrieve a corresponding content package 216 from content database 206. Context manager 201 then provides content delivery mechanism 208 with content package 216 for presentation. In some variations on these embodiments, content database 206 can provide content package 216 directly to content delivery mechanism 208.

Next, content delivery mechanism 208 presents content package 216 to the user. In doing so, content delivery mechanism 208 receives user interactions 212 from the user, and presents content 218-220 from content package 216 in response to user interactions 212.

It is possible that during operation, context manager 201 may determine that context 214 corresponds to more than one content package. In other words, context 214 satisfies the conditions for presenting more than one content package. In some embodiments of the present invention, context manager 201 prompts a user to select one content package to present from a set when context 214 corresponds to more than one content package. In other embodiments, context manager 201 selects one content package to present from a set based on predefined priorities or evolving weight values for content packages. For example, context manager 201 can select a content package which is the least-recent to be presented (e.g., has the oldest playback time stamp from the set of content packages), or can select a content package which is the most-recent to be presented. In another example, context manager 201 can select a content package from the set which has been presented the least number of times (e.g., has a lowest weight value from the set of content packages, which increments after the content package is presented), or can select a content package which has been presented the most number of times.

Creating Content

Figure 2B:
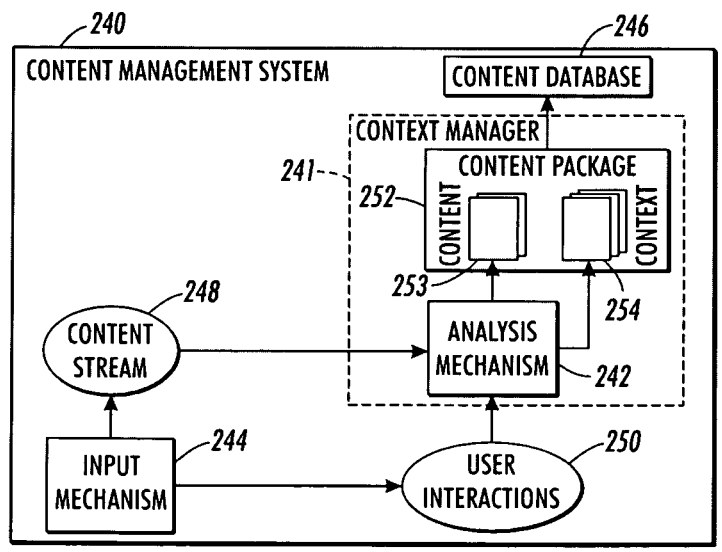
FIG. 2B illustrates a data flow for a content management system associated with allowing a user to create content in accordance with an embodiment of the present invention.

FIG. 2B illustrates a data flow for a content management system 240 associated with allowing a user to create content 253 in accordance with an embodiment of the present invention. In some embodiments, a user can create content 253 using content management system 240 on a mobile device or a personal computer (PC). Content management system 240 includes a context manager 241, an input mechanism 244, and a content database 246. Input mechanism 244 gathers a content stream 248 and user interactions 250, and sends content stream 248 and user interactions 250 to an analysis mechanism 242 of context manager 241. In some variations on these embodiments, user interactions 250 can be verbal commands uttered by the user to interact with a voice-based user interface (UI) of content management system 240. In other variations, user interactions 250 can be data provided by the user through a graphical user interface (GUI), including data entered using a keyboard, a mouse, a touch screen, or any other input device.

Analysis mechanism 242 creates a definition for a context 254, or selects a predefined context 254, based on user interactions 250. Also, analysis mechanism 242 creates a content 253 based on content stream 248 and user interactions 250. Next, context manager 241 creates a content package 252 that includes content 253 and context 254, and provides content database 246 with content package 252. Content database 246 then creates an entry for content package 252.

In some embodiments, a user can create a content package 252 using content management system 240, which includes creating a set of rules for presenting content package 252. In some variations on these embodiments, content management system 240 includes a GUI for creating a content package 252 that resembles a spreadsheet, which includes a number of columns for content, context, or presentation parameters, and a number of rows that allow a user to enter data for the corresponding parameter. In other variations, content management system 240 can achieve a functionality that is equivalent to the spreadsheet GUI described herein while using a different GUI layout. In some variations on these embodiments, content package 252 is created to include the data in a given spreadsheet. In other embodiments, content package 252 is created for a respective row of the spreadsheet.

During operation, a user can insert content 253 into content package 252 by clicking on an entry under the content heading of the GUI. In some variations on these embodiments, clicking on a content column entry enables the user to record a content stream 248, while in other variations, clicking on a content column entry enables a user to select prerecorded content 253 for the content column entry. Similarly, a user can click on an entry under any of the other column headings in a content package 252 to enter a value for the entry. Column headings for creating content package 252 include, but are not limited to, content, time, location, state, response, action correct, and action incorrect. In some embodiments, the entries under column headings time, location, and state can be used to define contexts for presenting content 253, and the entries under column headings response, action correct, and action incorrect can be used to define presentation rules.

Note that, in general, a context or activity can be defined in terms of high-level abstractions, such as "commuting to work." A high-level abstraction can corresponds to a combination of multiple low-level contextual information values, such as day of week, time of day, series of GPS traces, or accelerometer readings. In one embodiment, a low-level contextual information value can correspond to one or more measurable physical parameters. Furthermore, a presentation rule can be defined in terms of one or more high-level abstractions, such as "play while commuting to work and while comminuting from work." In addition, a user can share a presentation rule with another user. The second user can redefine the shared rule to accommodate his personal low-level contextual information values for corresponding high-level abstractions.

TABLE 1

| Content | Time | Location | State | Response | Action Correct | Action Incorrect |
| --- | --- | --- | --- | --- | --- | --- |
| JpI.mp3 | Any | Any | Moving | Mimic | 7-day-suspend | 5-min-suspend |
| JpHello.mp3 | Any | Any | Moving | Mimic | 7-day-suspend | 5-min-suspend |
| JpHowDoYouDo.mp3 | Any | Any | Moving | Mimic | 7-day-suspend | 5-min-suspend |

TABLE 1-continued

| Content | Time | Location | State | Response | Action Correct | Action Incorrect |
|---|---|---|---|---|---|---|
| JpGoodnight.mp3 | >21:00 | Bedroom | Moving | Mimic | 7-day-suspend | 5-min-suspend |
| JpGoodmorning.mp3 | <10:00 | Bedroom | Moving | Mimic | 7-day-suspend | 5-min-suspend |

TABLE 1 illustrates an exemplary set of rules for presenting content package 252 to a user in accordance with an embodiment of the present invention. The entries illustrated by Table 1 correspond to a number of audio clips in Japanese for practicing pronunciations to a number of words. The time column allows a user to specify a time of day when content 253 can be presented, which can be a time instance, or can be a time range. The location column allows a user to specify a location for where content 253 can be presented, and the state column allows a user to specify an action that the user can be performing when content 253 is presented. For example, a user that is learning Japanese can program content management system 240 to play "good morning" in Japanese when the user is moving around the bedroom before 10 AM, and to play "goodnight" in Japanese when the user is entering or moving around the bedroom after 9 PM.

The response column allows a user to specify an expected response to the presentation of content 253. The action correct column allows a user to specify actions that content management system 240 can perform if the user provides a correct response. The action incorrect column allows a user to specify actions that content management system 240 can perform if the user does not provide a correct response. For the example, the user can program content management system 240 to suspend an audio clip for a given phrase for seven days if the user correctly mimics the phrase in Japanese. The user can also program content management system 240 to repeat the phrase after five minutes if the user does not mimic the phrase with a proper pronunciation, thereby allowing the user to practice the phrase repeatedly until the user achieves a proper pronunciation of the Japanese phrase.

In some embodiments, content management system 240 allows a user to provide a desired name for a content entry. For example, a user may record a phrase in Japanese, and name the file using the English translation to the phrase. In some variations on these embodiments, a user can provide the name to content management system 240 as verbal speech, and content management system 240 produces a text string for the name by converting the speech to text. In other variations, a user can type the name using an input device of content management system 240. In the event that a user does not provide a name to a recording, content management system 240 can name the recording using a default file name, such as "Note1."

In some embodiments, content management system 240 allows a user to set a value to a column entry by providing a drop-down menu when a user taps or clicks on the column entry. This drop-down menu displays a vertical list of allowable values for the user to select from, and allows the user to select a value by clicking or tapping on the desired value. In other embodiments, content management system 240 allows a user to set a value to a column entry by allowing the user to type the value into the column entry.

In some embodiments, a user can provide content management system 240 with a list of allowable values (e.g., names or tags, and corresponding contextual information) for the entries of a given column (e.g., the time, location, state, or response columns presented in Table 1). For example, a location column entry may obtain an allowable set of values from a database of geographical locations selected by the user. In some embodiments, a user might define a geographical location for current or later use in content management system 240 when the user is at the desired location by notifying content management system 240 to store the current geographical location, and specifying a name for the stored geographical location (e.g., "home" or "bedroom"). In other embodiments, a user can specify a geographical location by selecting the location from a map, providing content management system 240 with the street address of the geographical location, or providing content management system 240 with geographic coordinates of the desired location, and then specifying a name or a tag for the geographical location. In some embodiments, content management system 240 can automatically infer geographic locations that are important to a user, and appropriate names for these locations, based on contextual information and routines performed by the user.

A column entry may also obtain an allowable set of values from a database of predefined names or tags with pre-set values which can be edited by the user. For example, a "moving" value for the state column entry can be an identifier which corresponds to a predefined context 254 that can be triggered by a motion detection mechanism.

In some embodiments, content package 252 can include more than one column of a given type. For example, content package 252 can include a column for Japanese entries and another column for corresponding English translation entries which are to be presented according to predetermined rules. In some embodiments, these predetermined rules can be specified in yet another column, and can define the conditions which cause a corresponding English translation to be presented (e.g., a time delay, a contextual condition, or a user response). In another variation, a user can instantiate more than one state columns to define more precise context trigger conditions for content 253. For example, a user can instantiate two state columns, and select a predefined or user-defined state for each state column (e.g., walking and shopping).

A response column entry may obtain a value that describes an expected response from the user in the form of an audio stream or a text string. In some embodiments, a response column entry may obtain a value in the same manner that content 253 is provided for a content column entry, where a user can record an expected response or select a prerecorded response. In other embodiments, a response column entry may obtain a value from the user in the form of a text string encapsulated by quotation marks, where the verbal response by the user and the expected response provided in the form of text are compared using text-to-speech and/or speech-to-text technologies. In yet other embodiments, a response column entry with a value mimic notifies content management system 240 that the response provided by the user should mimic the content identified by the corresponding entry under the content column.

Content management system 240 can perform an action responsive to a user response or interaction with the presentation of content 253. An action correct column entry can obtain a value that specifies an action to be performed by content management system 240 in the event that the user provides an expected response. Furthermore, an action incorrect column entry can obtain a value that specifies an action to be performed by content management system 240 on the occasion that the user does not provide an expected response. For example, content management system 240 can suspend playback of content 253 for a given time period, or can delete the content entry.

In some embodiments, an entry under the action correct column or the action incorrect column is a predefined capability of content management system 240. In other embodiments, an entry under the action correct column or the action incorrect column is a script or executable program that is provided by the user. A user can create a script or an executable program, which performs a sequence of operations, and can store and access state information gathered from user responses over a period of time. For example, a user can provide an action correct column entry with a script or executable program that deletes or alters (e.g., by changing a timing condition for presenting the content again) the corresponding content entry when the user mimics content 253 accurately on three consecutive attempts.

In some embodiments, an entry for a content column can have text-based content 253, including but not limited to, e-mail, Internet blog updates, Internet RSS feeds, tweets, text-based notes and reminders, or computer-readable pointers to content. In some variations on these embodiments, a computer-readable pointer can reference specific content. In other variations, the computer-readable pointer is defined based on metadata (e.g., a date, a geotag, or textual description for a content category), and is used to reference content associated with the metadata which can be gathered from a number of databases.

In some variations on these embodiments, content management system 240 can present the text-based content by displaying it on a screen of content management system 240. In other variations, content management system 240 can present text-based content 253 by converting content 253 to audio using text-to-speech technologies, and reproducing the audio. Furthermore, content management system 240 can apply a set of rules for presenting the text-based content 253. For example, content management system 240 can present emails to a user from a predefined set of people at certain times of the day, or under a given context 254.

TABLE 2 illustrates an exemplary set of rules for presenting a reminder content package 252 to a user in accordance with an embodiment of the present invention. An entry under the content column identifies a reminder in the form of text, and the other columns describe a set of rules for presenting the reminder to the user. For example, a user can program content management system 240 to present a first reminder at a specific day and time if the user is moving (e.g., walking, or jogging). If the user responds to content 253 by uttering "OK," content management system 240 deletes the content entry. Otherwise, if the user does not utter "OK," content management system 240 suspends content 253 of the content entry for fifteen minutes.

In a second example, a user can program content management system 240 to present a second reminder after a specific day and time, and while the user is driving. If the user responds to content 253 by uttering "OK," content management system 240 deletes the content entry. Otherwise, if the user does not utter "OK," content management system 240 suspends content 253 for fifteen minutes.

In a third example, a user can program content management system 240 to present a third reminder after a specific day and time, and while the user is stationary at the library (i.e., studying or reading at the library). In some variations on these embodiments, content management system 240 may determine if the user is wearing headphones before reproducing audio content 253 for the user while the user is in the library. If the user does not have headphones plugged into content management system 240, content management system 240 may flash a visual message to the user that requests the user to plug headphones in to the headphone jack, or to step outside the library. In other variations on these embodiments, content management system 240 may reproduce content 253 as text when the user is in the library. If content 253 contains verbal utterances, content management system 240 may use a speech-to-text mechanism to reproduce the verbal utterances as text.

TABLE 2

| Content | Time | Location | State | Response | Action Correct | Action Incorrect |
|---|---|---|---|---|---|---|
| Note1 text | =20070929:18:00 | Any | Moving | "OK" | Delete | 15-min-suspend |
| Note2 text | >20071001:09:00 | Any | Driving | "OK" | Delete | 15-min-suspend |
| Note3 text | >20071001:12:10 | Library | Stationary | "OK" | Delete | 1-day-suspend |
| Note4 text | =20071002:10:00 | Office | Moving | "OK" | Delete | 15-min-suspend |
| Note5 text | >20071003:18:00 | Office | Moving | "OK" | Delete | 15-min-suspend |

Content management system 240 can include an input mechanism 244 that supports short-range communication protocols such as Near Field Communication (NFC), which can be used to read radio frequency identification (RFID) tags, or to interact with other NFC devices at a short distance. Content management system 240 that supports the NFC protocol can identify physical objects based on RFID tags attached to the objects, and can use the gathered information as contextual information for presenting content 253, or can use a detected NFC signal as a user interaction 250.

For example, a user can program content management system 240 to present a notification to the user to carry an umbrella when content management system 240 detects that the user is about to walk outside the house, determines from an Internet forecasting service that it will rain later in the day, and does not detect an RFID tag that identifies the user's umbrella. In another example, a user can program content management system 240 to notify the user's spouse that the user is returning home when the user passes an RFID tag on the doorframe at work or in the car during the evening.

Audio-Based Content Creation

In some embodiments, content management system 240 provides an audio-based user interface (UI). For example, a user can interact with content management system 240 using the audio-based UI when creating a new reminder content while on the move. In some variations on these embodiments, the audio-based UI for content management system 240 follows a linguistic scheme that parallels the GUI for content management system 240. An audio-based UI that resembles a GUI of content management system 240 facilitates a user in becoming acclimated to the audio-based UI when the user is already familiar with the corresponding GUI. For example, an audio-based UI for content management system 240 may interact with a user that is creating a new reminder using the following dialogue:

User: "To-dos, New Note."
    System: "Begin Recording To-do."
    User: "[verbal utterances] . . . [pause]."
    System: "Recording complete."
    User: "System, continue recording, [more verbal utterances] . . . [pause]."
    System: "Continued recording complete."
    User: "Present to me in time Any, Location Home, State Stationary, Response OK, [pause]."
    System: "Note complete."

In some variations on these embodiments, a user can state a value for a parameter (e.g., "Any time, home, stationary, response OK"). In other variations, content managemtn system 240 can present audio prompt a user to specify a value for each column entry (e.g., "Specify time condition"). In further variations, a user does not have to communicate a value for every entry associated with a column of the content creation GUI. In the event that a user does not provide a value for a given column of the content creation GUI, content management system 240 will fill the corresponding entry with a default value. For example, a user can configure content management system 240 so that the default location is the current location of the user. In a second example, a user can configure content management system 240 so that the default location is the any value. In a further example, the user can set the default time for presenting content 253 to the any value, and can set the default response to content 253 to "OK."

In another example, an audio-based UI for content management system 240 may interact with a user that is creating a presentation layout using the following dialogue:

User: "Presentation [presentation name], Slide One, [pause]."
    System: "Begin Recording Presentation."
    User: "Slide One, Point One, [speaks remainder of slide content], [pause]."
    System: "Recording complete."
    User: "System, continue recording, Slide Two, [pause]."
    System: "Continue Recording Presentation."
    User: "Slide Two, [speaks remainder of slide content], [pause]."
    System: "Continued recording complete."

Matching Content to Activity

In some embodiments of the present invention, content management system 240 is capable of inferring a context 254 associated with a user from contextual information associated with a user, and is capable of matching content 253 to the inferred context 254 in a number of ways.

In some embodiments, content management system 240 can determine if the user is receptive to a given content 253, and can give preference to a specific type of content 253 as a result of an activity being performed by the user. For example, a user that has configured content management system 240 to present tutoring content may wish to receive tutoring lessons for learning Japanese when the user is commuting to work. More specifically, content management system 240 may present audio-based Japanese lessons to the user when the user is driving to work, and may present Japanese reading and writing lessons to the user when the user is riding the train to work. In a further example, content management system 240 can provide lessons to the user when the user is walking and is receptive to learning, and can avoid providing lessons when it detects audible speech because the user may be occupied watching television or having a conversation.

In some embodiments, content management system 240 can be programmed with more than one content package 252. In effect, a user can program content management system 240 to vary the types of content 253 that are presented for different values of context 254. For example, the user can program content management system 240 to restrict language lessons to a particular geographic or geospatial location, and to restrict technical lessons to weekdays or evenings.

In some embodiments, a user can configure content management system 240 to present content 253 that is relevant to the user's current specific behavior. For example, if the user is walking, content management system 240 can provide a language lesson by describing the action of walking to the user in Japanese, or can provide content 253 in Japanese that is relevant to the location that the user is walking through. In another example, if content management system 240 determines that the user is in the kitchen and it is morning, then content management system 240 can infer that the user is preparing breakfast or having breakfast, and may provide breakfast-related Japanese language lessons. In other examples, content management system 240 can provide other types of content 253 based on an inferred context 254, including content types such as music, history lessons, Internet blogs, text-to-speech email, etc.

In some embodiments, content management system 240 can provide lessons in anticipation of an action that a user is about to perform. In some variations on these embodiments, content management system 240 can present reminder content 253 to the user in advance so that the user can adjust his or her plans. In other variations, content management system 240 can provide natural grammar lessons to a user by providing language lessons in the appropriate grammatical tense. For example, content management system 240 can teach grammar to a user based on the user performing a given action. As the user changes his or her walking state, content management system 240 may produce a corresponding content 253, such as: "I will walk," "I am walking," or "I walked." In a further example, content management system 240 can provide Japanese language lessons relevant to greeting people in the future tense to a user when the user enters a bus or train on a weekday morning. That is, content management system 240 can use grammatical rules to present a sequence of content 253 that matches the anticipation, start, continuance and completion of an activity.

Content Sharing and Delivery Infrastructure

In some embodiments, a user can create shareable content using content management system 240 on a mobile device or a PC. The shareable content is a content package 252 that a user can download, modify, and share with other content management systems. Furthermore, a content package 252 can include a number of content entry fields for text, graphics, audio, and/or video content 253.

Once a user invests the initial effort into creating a content package 252, content package 252 can be easily shared and modified by other users. In some embodiments, a user can upload a content package 252 onto an Internet website to make content package 252 publicly available. In some other embodiments, a user can download a content package 252 from an Internet website, and modify content package 252 to insert, modify, and/or remove content 253 from content package 252. In some variations on these embodiments, a user can modify content package 252 to insert, modify, and/or remove presentation rules from content package 252.

In some embodiments, an abstract name or tag for a contextual condition (e.g., "home" or "shopping") can be recognized by the content management system, and can be easily shared between users without the users having to redefine specific contextual information associated with these names or tags. For example, a first user can define a home location name to refer to a specific street address, and a second user can define the home location name to refer to a different street address. Therefore, when the first user shares a content package 252 with the second user, any reference to the home location name in the content package will be automatically translated to the street address of the second user. The second user does not have to redefine the contextual information associated with the home location name of content package 252.

In some embodiments, a user can share a content package 252 when it is not complete. Content package 252 is not complete when one or more entry fields of content package 252 do not have a corresponding content 253. Sharing an incomplete content package 252 allows for a number of users to cooperate in creating shareable content, and allows a number of users to learn from each other.

For example, a user may invest a significant effort to create a content package 252 for a Japanese language tutorial by creating an extensive list of words and phrases in English, and may even include Japanese translations for some of the corresponding entries. These English and Japanese entries can be audio content 253, or they can be written text. The user can then make content package 252 publicly available, and allow other users to download and improve upon content package 252. Other users can replace the initial Japanese translations with audio recordings that have better pronunciation, and can include Japanese audio recordings for English words and phrases that do not have a corresponding Japanese audio translation. Furthermore, Japanese-speaking users may insert new entries into content package 252 in Japanese for words and/or phrases to which they would like an English translation, thereby allowing an English-speaking user to provide a corresponding audio recording in English.

In some embodiments of the present invention, a content entry or a set of content entries in content package 252 have one or more content type description entries. A content type description can be a text string which describes a characteristic of content 253 of the entry (e.g., "reminder," "tourist information," or "conjugations of the Japanese verb taberu"). In some variations, the content type description for a content entry can be predefined. In some other variations, the content type description can be defined by the content management system based on related contextual information (e.g., time, location, user activity, etc.). In further variations, the content type description can be defined by a user.

In some embodiments, the content type description entries in content package 252 can be used to classify a collection of content packages based on the type of content they contain. The content type descriptions can be used to search for content 253 with a matching or related content type description stored in content database 246 or any other database or source of content. For example, the user can search for content entries defined as "conjugations of the Japanese verb taberu," or "conjugations of Japanese verbs."

In some embodiments of the present invention, content management system 240 can use artificial intelligence to create a content package 252 that is tailored to a user. In one variation on these embodiments, content management system 240 uses natural language processing (NLP) to parse text entered by the user.

For example, content management system 240 can be in the form of an Internet website that has HTML and XML-structured content 253 tied to a database that contains vocabulary and grammatical rules. Content management system 240 can enable a user to interact with a textual UI to generate sentences in which words, tense and other variations can be automatically varied so that the user can practice learning grammatical rules by example. Based on the interactions between content management system 240 and the user, content management system 240 can create a content package 252 that implements a lesson plan that allows the user to practice many variations on a number of rules so that the user can learn the rules through practice.

In a further example, if a user wants to learn how to use passive sentence constructions in Japanese, the user can provide content management system 240 with an exemplar English text entry "Alice was scolded by the teacher." The user can then use a GUI to specify a search for content packages 252 or content entries which contain grammatically similar results in English paired with Japanese translations. In response, content management system 240 can generate grammatically equivalent sentences, perhaps with the option to vary the subject, object, verse, and tense. In some embodiments, content management system 240 can generate grammatically equivalent sentences by first parsing the user-entered English sentence to determine its linguistic deep structure. Then, content management system 240 can generate a system-defined content type description string based on the user-entered English sentence, and can search for English-Japanese content pairs which have content type descriptions that match some user-specified aspect of the phrase's deep structure, while varying any or all of the subject, object, verb, and tense. For example, content management system 240 can generate grammatically similar sentences using the passive construction, including:

"The dog was being scolded by mother;"
"Mary was praised by the professor;"
"Paul is being interviewed by the journalist;"
"John will be called by the department head;"
"The children used to be scolded by father;" and
"The apple will be eaten by Sara."

In some variations on these embodiments, the grammatically equivalent sentences could be audio-based content 253 that was recorded earlier by other users, where a given audio recording is associated with a content type description text string for the recorded content. Content management system 240 can analyze the grammatical deep structure of the sentence entered by the user to find matches in its database for content with an associated content type description text string. Then, content management system 240 can assemble recordings, content entries, and/or entire content packages from the database that match into a new content package 252.

Figure 3:
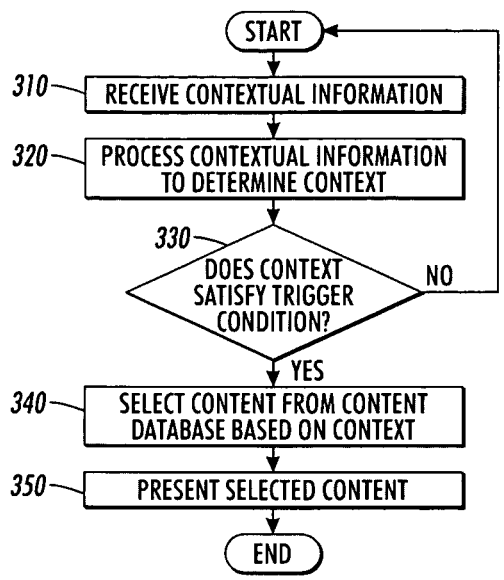
FIG. 3 presents a flow chart illustrating a process for delivering context-based content to a user in accordance with an embodiment of the present invention.

FIG. 3 presents a flow chart illustrating a process for delivering context-based content to a user in accordance with an embodiment of the present invention. The content management system begins by receiving contextual information (operation 310), and processing the contextual information to determine a context (operation 320). Next, the content management system determines whether the context satisfies a trigger condition (operation 330). If so, the content management system selects content from the content database based on the context (operation 340), and presents the selected content to the user (operation 350).

Figure 4:
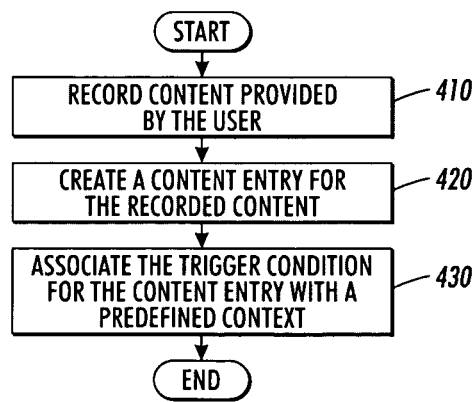
FIG. 4 presents a flow chart illustrating a process for creating context-based content in accordance with an embodiment of the present invention.

FIG. 4 presents a flow chart illustrating a process for creating context-based content in accordance with an embodiment of the present invention. The content management system begins by recording content provided by the user (operation 410). Then, the content management system creates a content entry in the content database for the recorded content (operation 420). Next, the system associates the content entry with a predefined context by specifying one or more trigger conditions for the content entry (operation 430). In some variations, a user can manually associate the content entry with a predefined context.

Figure 5:
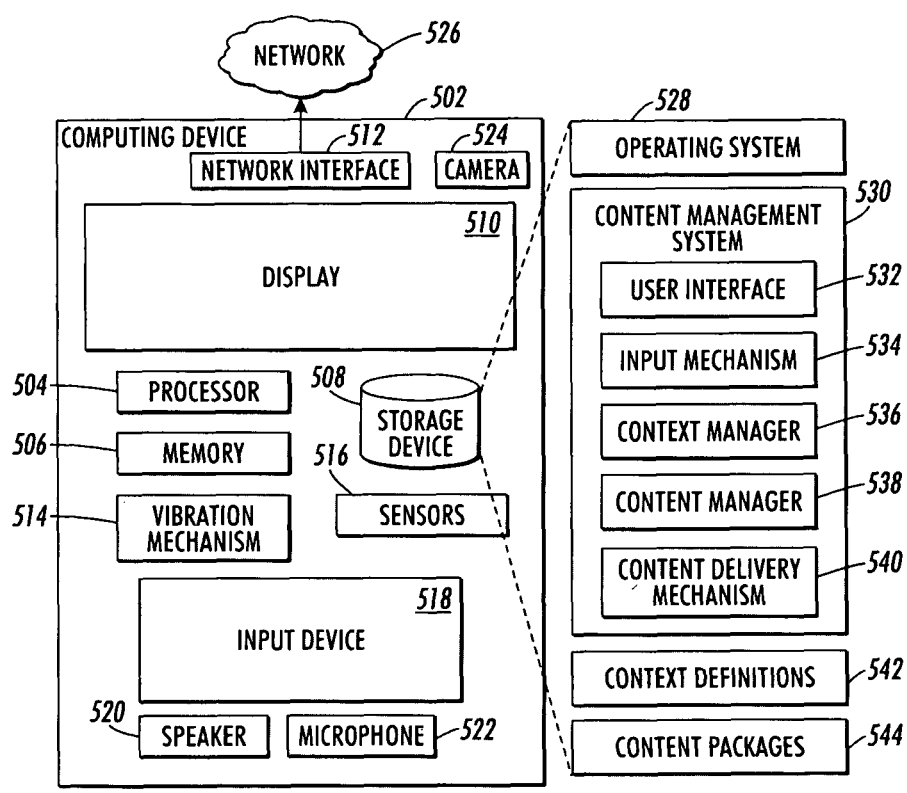
FIG. 5 illustrates an exemplary computing device that facilitates creating and delivering context-based content in accordance with an embodiment of the present invention.

FIG. 5 illustrates an exemplary computing device 502 that facilitates creating and delivering context-based content in accordance with an embodiment of the present invention.

Computing device 502 includes a processor 504, a memory 506, and a storage device 508. Furthermore, computing device 502 comprises a display 510, a network interface 512, a vibration mechanism 514, a number of sensors 516, an input device 518, a speaker 520, a microphone 522, and a camera 524. Furthermore, computing device 502 is coupled to a network 526 through network interface 512. In one embodiment, network 526 includes a cellular network. In a further embodiment, network 526 includes the Internet.

Storage device 508 stores an operating system 528, a content management system 530, context definitions 542, and content 544. Furthermore, content management system 530 includes a user interface (UI) 532, an input mechanism 534, a context manager 536, a content database 538, and a content delivery mechanism 540. In one embodiment, UI 532 is a graphical user interface (GUI). In another embodiment, UI 532 is a voice-based user interface.

During operation, content management system 530 is loaded from storage device 508 into memory 506 and executed by processor 504. In one embodiment of the present invention, content management system 530 presents content to a user based on a context associated with the user. To do so, input mechanism 534 of content management system 530 gathers contextual information associated with the user from a number of input sources (e.g., network interface 512, sensors 516, input device 518, microphone 522, and/or camera 524), and context manager 536 of content management system 530 interprets the basic contextual information to infer a user-defined context from context definitions 542 that describes an event or environmental factor associated with the user. Context manager 536 then searches for a content package in content database 538 that is triggered by a number of inferred contexts, and content delivery mechanism 540 of content management system 530 presents the selected content package.

In another embodiment of the present invention, content management system 530 allows a user to create a content package. To do so, input mechanism 534 gathers a content stream and user interactions from a number of input sources, and sends the content stream and the user interactions to context manager 536. Context manager 536 creates a context definition, or selects a user-defined context from context definitions 542, based on the user interactions. Also, context manager 536 creates a content file based on the content stream and the user interactions, and creates a content package that includes the content file and the context. Next, context manager 536 provides content database 538 with the content package, and content database 538 creates an entry for the content package.

Variations of Embodiments

Activity-Triggered Grammatical Instruction

In some embodiments, content management system 530 can be configured by a user, based on the mechanisms described above, to teach grammatical rules to the user by example. In doing so, content management system 530 detects a context associated with the user (e.g., actions such as going out to dinner or driving a car), and presents audio content that contains expressions in a target language that are appropriate to the context, and at the right time. For example, content management system 530 can present the following audio content under the appropriate context:

When the user enters the garage or opens the car door: "I will drive my car."
When the user begins driving: "I am driving my car."
When the user leaves the car: "I drove my car."

Language in Context

In some embodiments, content management system 530 can retrieve geotagged content from a server to present content that is appropriate to the geographical location to the user. For example, based on the mechanisms described above, users that visit a popular tourist location can create geotagged content that describes information about the location to help others learn more about the location, and upload this content onto a public database. Furthermore, a number of users may upload geotagged content about the location in a number of languages. Then, when another user visits this geographical location, content management system 530 can download content that is geotagged with this location, and can present the content to the user. A user that is learning a new language can configure content management system 530, based on the mechanisms described above, to retrieve content in that language, thereby listening to language examples that are appropriate to the user's activities.

Collaborative To-Dos

In some embodiments, content management system 530 can create and transmit an electronic message or reminder to a remote device so that the remote device presents the content under a given user-defined context. The electronic messages and reminders can be in the form of text, or audio content. In some variations on these embodiments, content management system 530 can convert text messages and reminders into audio content using text-to-speech technology. These embodiments can provide a user with a new medium for sending important information to a recipient, and can ensure that the recipient will receive the content when the recipient is in a suitable context and activity state, and can complete the task.

Live Connections to Experts

In some embodiments, content management system 530 can communicate content between users that do not know each other personally. For example, content management system 530 can be used to implement a tutoring service, where students can submit a shareable content package to the tutoring service using content management system 530, and the tutoring service forwards the content package to an appropriate tutor for the given topic. In some variations, the tutoring service can be implemented by a distributed version of content management system 530, where content management systems for students and teachers forward content requests and content packages to each other. In some other variations, the tutoring service can be implemented as an Internet service, where students and teachers can upload and download content packages and perform requests for relevant content packages.

A tutor can use the tutoring service to subscribe to a process which monitors the content requests and incomplete content packages which are submitted by other users and are related to a given content type description. When a tutor is notified of a content request or an incomplete content package from a student, the tutor can provide feedback to the student by creating a new content package which includes a response to the requests from the tutor, or can modify the content package to insert feedback content into the content package. Then, the tutor's content management system 530 can make the new or modified content package available to the student. The tutor's new content can then be retrieved via the tutoring service by the student's personal version of content management system 530.

Progress Analytics

In some embodiments, content management system 530 can store state information associated with interactions from a user when presenting a content package. For example, a content package that provides interactive lessons to a user may record accuracy information for the user. Content management system 530 can utilize this information to perform progress analytics, and alter the pace and difficulty of the lesson plan in response to the goals and the learning rate for the user. Content management system 530 may provide a user that is having trouble learning a specific sub-topic with more lessons on that sub-topic, and may increase the pace or difficulty for a user that is learning the material relatively easily. Furthermore, if a given user has a fixed deadline for studying a specific topic, and the user is behind on lessons, content management system 530 can increase the pace of the lesson plan to ensure the user is prepared by the deadline.

Context-Dependent Versus Context-Independent Learning

In some embodiments, content management system 530 can strengthen a user's memory on a given lesson plan by alternating between providing lesson content within an appropriate context, and providing the lesson content out of any appropriate context. On some occasions, content management system 530 can present lessons to a user in a context under which the user is most effective at learning. On other occasions, content management system 530 can provide the user with lessons in inappropriate and/or inconvenient contexts to radically separate the lesson content from any contextual cues or reminders the user may be relying on.

Evolution

In some embodiments, content management system 530 can evolve a method for delivering a lesson plan to a user. In some variations on these embodiments, content management system 530 can lengthen the period of time it waits before offering the user a correct response to a question when the user is expected to know the lesson material. In other variations, content management system 530 can allow a user with a decreasing period of time to provide a response to a question. In yet other variations, content management system 530 could decrease the clarity of the questions it asks when the user has reached an advanced level of understanding of the subject.

Context Creation

In some embodiments, publishers could create and publish their content on the Internet as content packages for content management system 530. A user that is learning a new language may prefer to pay for a professionally created and advanced language lesson, as opposed to spending significant effort in gathering a multitude of content packages that provide language examples.

Constant Audio Feedback

In some embodiments, content management system 530 can use speech recognition to complement an instructional lesson. For example, content management system 530 could use speech recognition to supply a user that is learning a new language with constant feedback on the user's grammar and pronunciation. In another example, content management system 530 could use speech recognition to help a user alter his/her communication style for a target audience. In yet another example, when a user is creating basic second language educational type content for others, content management system 530 could use speech or text recognition, and deep sentence structure recognition, to provide the user with hints that the user should use language that is simpler for a foreigner to understand. For example, content management system 530 can suggest more common nouns, verbs, and simpler sentence constructions.

Contextual Tagging

In some embodiments, content management system 530 can build context-based inferences for a situation, which can be defined geographically or temporally, based on contextual information that is gathered at a location at a given time, day of week, or day of year. When a user of content management system 530 enters a situation, the user will tend to interact with the environment in a manner that is specific to the situation. Content management system 530 can take advantage of its observations of behaviors aggregated from a number of users in the same situation to infer a context associated with that situation. In some embodiments, content management system 530 does not need to store personal information associated with a specific user, it only needs to store the predefined or user-defined behavior descriptions (e.g., "moving," "walking," "coffee break," etc.) it detects. For example, when a user is sitting at a coffee shop during opening hours while using content management system 530, the user may have a tendency to utter terms and phrases that are associated with a coffee shop, including "coffee," "beans," "pastry," "Wi-Fi," "hot-spot," "relaxing," "great cup of coffee," "tasty cookies," "Internet access" and "Internet café." Based on predefined or user-defined activities and/or observed words and phrases that are detected, content management system 530 can determine that a user's current situation is associated with the term "coffee" (e.g., the user is currently at a coffee shop).

In some variations on these embodiments, content management system 530 can provide a public context database with a collection of keywords that it gathers from detected user activities or utterances under a given context, thereby contributing to the pool of contextual knowledge of the public context database. The public context database can learn from the keywords provided by a number of content management systems by identifying the terms and phrases that are most common under a given context, and associating these keywords and phrases with the context.

In some other variations, content management system 530 monitors the text and speech communicated by a user as part of its context monitoring capability (receive contextual information 310), on a number of applications to gather context-specific keywords. For example, the user may communicate information using a number of applications on a mobile device (e.g., e-mail, Internet search engines, text messages, mobile Web 2.0, etc.) These variations allow users to provide context-specific keywords and phrases to a public context database, without having to tag a context with related keywords. In some embodiments, content management system 530 does not save the specific key words captured from a user, but can add a unit of weight to a word entry of a dictionary of known words as words are detected within a given situation. Over time, the public context database will give preference to keywords and phrases that appear most commonly in a given situation, and can include these keywords within a database that associates specific keywords and phrases with corresponding situations.

In some variations on these embodiments, content management system 530 includes a voice-activated keyword lookup mechanism, which uses a speech-to-text mechanism to convert speech to text when it detects verbal utterances. Content management mechanism 530 uses the text generated from these verbal utterances to search in a public context database to infer a context that can be used to identify the current geographical location of the user. In some variations on these embodiments, the keyword lookup mechanism can gather keywords from the environment using a microphone, and/or can gather keywords from a phone conversation that the user is engaged in. In some other variations, the keyword lookup mechanism can gather keywords from terms and phrases that a user receives or sends using content management system 530, including words from a text message, e-mail, or any other communication mechanism.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for delivering context-based content to a first user, the method comprising:
   receiving at least one content package, wherein the content package includes at least one content piece and a set of rules associated with the content package, wherein the set of rules includes a trigger condition and an expected response, and wherein the trigger condition specifies a context that triggers a presentation of the content piece;
   receiving a set of contextual information with respect to the first user;
   processing the contextual information to determine a current context for the first user;
   determining whether the current context satisfies the trigger condition;
   in response to the trigger condition being satisfied, presenting the content piece to the first user;
   receiving a response from the first user corresponding to the presented content piece;
   determining whether the received response matches the expected response; and
   performing an action based on an outcome of the determination.

2. The method of claim 1, wherein the method further comprises creating the content package for the first user, wherein creating the content package involves:
   recording the content piece that is provided by the first user;
   creating an entry in a content database for the recorded content piece, wherein the entry includes one or more trigger conditions; and
   associating the one or more trigger conditions for the entry with a user-defined context; and
   wherein the method further comprises:
      continuously comparing previously defined trigger conditions for the entry with the ongoing context of the first user; and
      in response to the one or more trigger conditions being met, retrieving the content piece, and presenting the retrieved content piece to the first user.

3. The method of claim 2, wherein the method further comprises creating a shareable content piece for the first user, wherein creating the sharable content piece involves:
   recording the sharable content piece that is provided by the first user; and
   creating a content package for the recorded sharable content piece, wherein the content package includes the recorded sharable content piece, and wherein the content package includes one or more trigger conditions;
   wherein the content package allows a recipient of the content package to insert, modify, and/or remove content or trigger conditions from the content package.

4. The method of claim 1, wherein the method further comprises defining a context by:
   creating one or more context entries in a context manager; and
   associating a respective context entry with a set of contextual information.

5. The method of claim 4, wherein the method further comprises updating entries in the content database and updating the context entries in the context manager responsive to actions performed by the first user.

6. The method of claim 1, wherein the context is defined as a combination of at least a high-level abstraction which corresponds to one or more low-level contextual information values, wherein the low-level contextual information values can correspond to one or more measurable parameters.

7. The method of claim 1, wherein a respective rule is defined with one or more high-level abstractions.

8. The method of claim 7, further comprising allowing the first user to share the rules with a second user, wherein the second user can redefine the shared rules based on the second user's low-level contextual parameters.

9. The method of claim 1, wherein presenting the content piece comprises sharing the content piece with a remote device.

10. The method of claim 1, wherein the contextual information includes one or more of: time, date, location, proximity to a system-detectable tag, device orientation, velocity, direction, distance, vibration, altitude, temperature, pressure, humidity, sound, luminous intensity, camera image, and video stream.

11. The method of claim 1, wherein the content piece includes one or more of: audio clip, image, video stream, language lesson, e-mail, weather report, calendar reminder, news feed, rich site summary (RSS) feed, information update from a Web 2.0 application, and Internet blog.

12. A computer-readable storage medium storing instructions that when executed by a computer cause the computer to perform a method for delivering context-based content to a first user, the method comprising:
   receiving at least one content package, wherein the content package includes at least one content piece and a set of rules associated with the content package, wherein the set of rules includes a trigger condition and an expected response, and wherein the trigger condition specifies a context that triggers a presentation of the content piece;
   receiving a set of contextual information with respect to the first user;
   processing the contextual information to determine a current context for the first user;
   determining whether the current context satisfies the trigger condition;
   in response to the trigger condition being satisfied, presenting the content piece to the first user;
   receiving a response from the first user corresponding to the presented content piece;
   determining whether the received response matches the expected response; and
   performing an action based on an outcome of the determination.

13. The computer-readable storage medium of claim 12, wherein the method further comprises creating the content package for the first user, wherein creating the content package involves:

recording the content piece that is provided by the first user;

creating an entry in a content database for the recorded content piece, wherein the entry includes one or more trigger conditions; and associating the one or more trigger conditions for the entry with a user-defined context; and wherein the method further comprises:

continuously comparing previously defined trigger conditions for the entry with the ongoing context of the first user; and in response to the one or more trigger conditions being met, retrieving the content piece and presenting the retrieved content piece to the first user.

14. The computer-readable storage medium of claim 13, wherein the method further comprises creating a shareable content piece for the first user, wherein creating the sharable content piece involves:

recording the sharable content piece that is provided by the first user; and creating a content package for the recorded sharable content piece, wherein the content package includes the recorded sharable content piece, and wherein the content package includes one or more trigger conditions;

wherein the content package allows a recipient of the content package to insert, modify, and/or remove content and/or trigger conditions from the content package.

15. The computer-readable storage medium of claim 12, wherein the method further comprises defining a context by:

creating one or more context entries in a context manager; and associating a respective context entry with a set of contextual information.

16. The computer-readable storage medium of claim 15, wherein the method further comprises updating entries in the content database and updating the context entries in the context manager responsive to actions performed by the first user.

17. The computer-readable storage medium of claim 12, wherein the contextual information includes one or more of: time, date, location, proximity to a system-detectable tag, device orientation, velocity, direction, distance, vibration, altitude, temperature, pressure, humidity, sound, luminous intensity, camera image, and video stream.

18. The computer-readable storage medium of claim 12, wherein the content piece includes one or more of: audio clip, image, video stream, language lesson, e-mail, weather report, calendar reminder, news feed, rich site summary (RSS) feed, information update from a Web 2.0 application, and Internet blog.

19. An apparatus for delivering context-based content to a first user, comprising:

a processor;

an input mechanism configured to receive a set of contextual information with respect to the first user;

a receiving mechanism configured to receive at least one content package, wherein the content package includes at least one content piece and a set of rules associated with the content package, wherein the set of rules includes a trigger condition and an expected response, and wherein the trigger condition specifies a context that triggers a presentation of the content piece;

a content delivery mechanism configured to present the context-based content to a first user; and a context manager configured to process the contextual information to determine a current context for the first user, and to determine whether the current context satisfies the trigger condition;

wherein in response to the trigger condition being satisfied, the content delivery mechanism is configured to present the content piece to the first user and wherein while presenting the content piece to the first user, the content delivery mechanism is further configured to:

receive a response from the first user corresponding to the presented content piece, determine whether the received response matches the expected response, and perform an action based on an outcome of the determination.

20. The apparatus of claim 19, wherein the apparatus further comprises a content management mechanism configured to create the content package for the first user, wherein creating the content package involves:

recording the content piece that is provided by the first user;

creating an entry in a content database for the recorded content piece, wherein the entry includes one or more trigger conditions;

associating the one or more trigger conditions for the entry with a user-defined context;

continuously comparing previously defined trigger conditions for the entry with the ongoing context of the first user; and in response to the one or more trigger conditions being met, retrieving the content piece and presenting the retrieved content piece to the first user.

21. The apparatus of claim 20, wherein the content management mechanism is further configured to create a shareable content piece for the first user, wherein creating the sharable content piece involves:

recording the sharable content piece that is provided by the first user; and creating a content package for the recorded sharable content piece, wherein the content package includes the recorded sharable content piece, and wherein the content package includes one or more trigger conditions;

wherein the content package allows a recipient of the content package to insert, modify, and/or remove content or trigger conditions from the content package.

22. The apparatus of claim 19, wherein the context manager defines a context by:

creating one or more context entries for the context; and associating a respective context entry with a set of contextual information.

23. The apparatus of claim 22, wherein the apparatus is further configured to update entries in the content database and update the user-defined context entries in the context manager responsive to actions performed by the first user.

24. The apparatus of claim 19, wherein the contextual information includes one or more of: time, date, location, proximity to a system-detectable tag, device orientation, velocity, direction, distance, vibration, altitude, temperature, pressure, humidity, sound, luminous intensity, camera image, and video stream.

25. The apparatus of claim 19, wherein the content piece includes one or more of: audio clip, image, video stream, language lesson, e-mail, weather report, calendar reminder, news feed, rich site summary (RSS) feed, information update from a Web 2.0 application, and Internet blog.

* * * * *